United States Patent
Spengler

[11] Patent Number: 5,868,170
[45] Date of Patent: Feb. 9, 1999

[54] AXIAL INTERLOCK SYSTEM FOR FLUID CONTAINMENT SYSTEM HAVING INNER AND OUTER CONDUITS

[75] Inventor: Richard Spengler, Gundelfingen, Germany

[73] Assignee: Simona AG, Kirn, Germany

[21] Appl. No.: 696,536

[22] Filed: Apr. 5, 1996

Related U.S. Application Data

[63] Continuation of Ser. No. 45,626, Apr. 9, 1993, abandoned.

[51] Int. Cl.$^6$ ........................................... F16L 9/18
[52] U.S. Cl. ......................... 138/113; 138/114; 285/138; 156/304.6
[58] Field of Search ..................................... 138/111, 113, 138/114, 148, 104; 285/133.1, 137.1, 138, 286; 156/304.2, 304.6

[56] References Cited

U.S. PATENT DOCUMENTS

| | | | |
|---|---|---|---|
| 3,013,925 | 12/1961 | Larsen . | |
| 3,057,378 | 10/1962 | Fennema et al. | 138/114 |
| 3,723,705 | 3/1973 | Province . | |
| 3,998,682 | 12/1976 | Harmsen . | |
| 4,099,560 | 7/1978 | Fischer | 138/114 |
| 4,157,194 | 6/1979 | Takahashi | 138/113 |
| 4,219,224 | 8/1980 | Hanley | 138/113 |
| 4,400,019 | 8/1983 | Fruck | 285/286 |
| 4,769,102 | 9/1988 | Neumüller . | |
| 4,779,652 | 10/1988 | Sweeney | 138/113 |
| 4,786,088 | 11/1988 | Ziu | 138/113 |
| 4,797,621 | 1/1989 | Anderson . | |
| 4,886,305 | 12/1989 | Martin | 138/113 |
| 5,085,471 | 2/1992 | Ziu | 285/138 |
| 5,087,308 | 2/1992 | Wermelinger | 285/138 |
| 5,124,533 | 6/1992 | Dommer . | |
| 5,141,184 | 8/1992 | Ziu | 138/113 |
| 5,185,049 | 2/1993 | Bacon . | |
| 5,186,502 | 2/1993 | Martin | 138/113 |

FOREIGN PATENT DOCUMENTS 11-763121  9/1980  U.S.S.R. .

*Primary Examiner*—Patrick F. Brinson
*Attorney, Agent, or Firm*—Fitch, Even, Tabin & Flannery

[57] ABSTRACT

A fluid conduit containment system includes an inner carrier conduit of a first type of resinous thermoplastic material having a first heat weldable annular end face and an outer safety containment conduit formed of a second type of heat weldable, resinous thermoplastic material aligned coaxially in outwardly surrounding, radially spaced apart relation with the inner conduit for containing any fluid leakage therefrom. The second conduit has a second heat weldable annular end face in concentric coplanar relation with the first heat weldable end face and an anchor-spacer extends between the inner and outer conduits for maintaining the conduits in permanently spaced apart relation. The anchor-spacer includes a pair of coaxially aligned spacer rings or halves joining a circumferential outside surface on the inner carrier conduit and extending radially outwardly thereof to engage a circumferential inside surface on the outer containment conduit. The ring halves include annular confronting weld faces adapted to be heat welded together between the inner and outer conduits for securing the conduits against relative radial and axial displacement wherever an anchor-spacer is provided in the system.

6 Claims, 4 Drawing Sheets

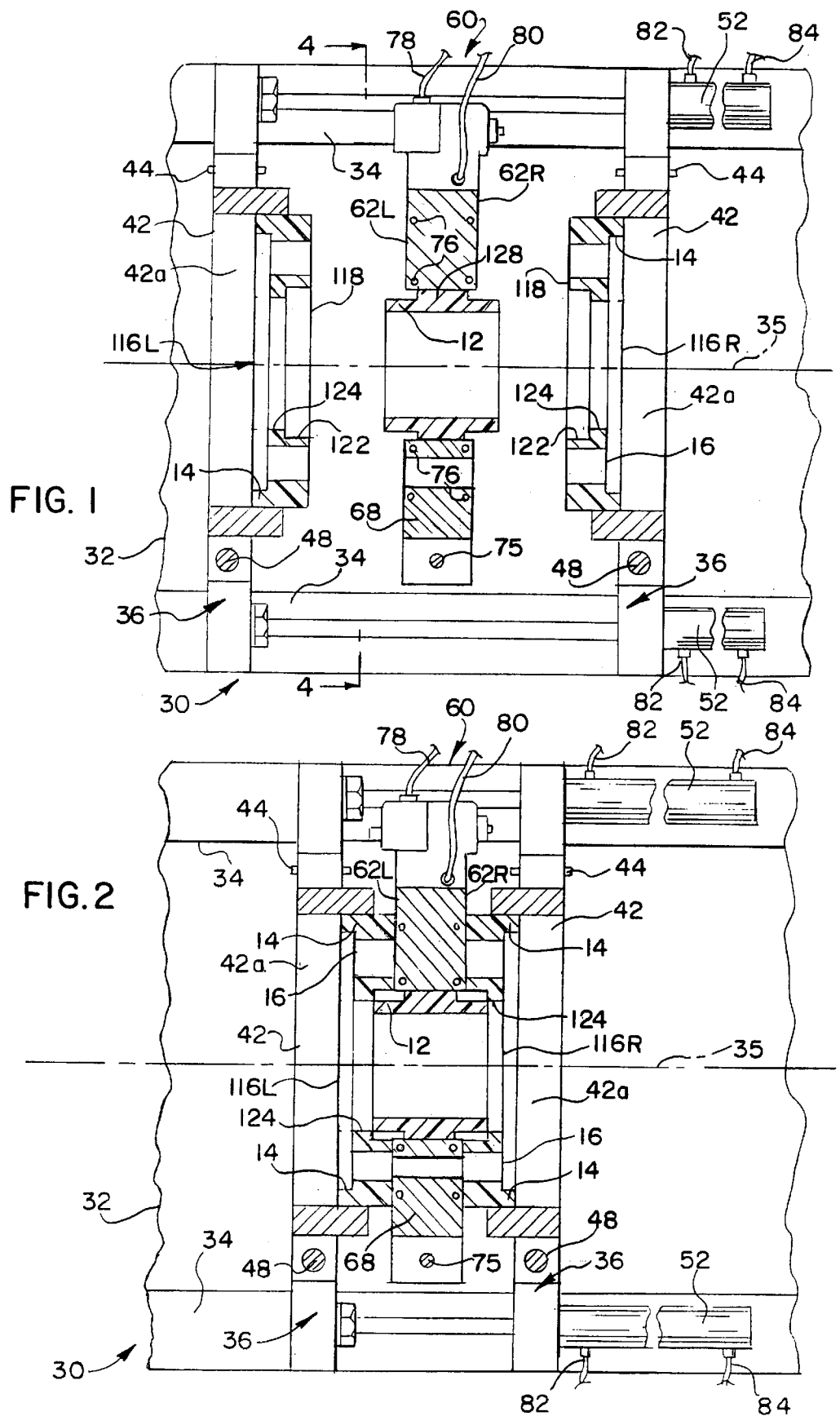

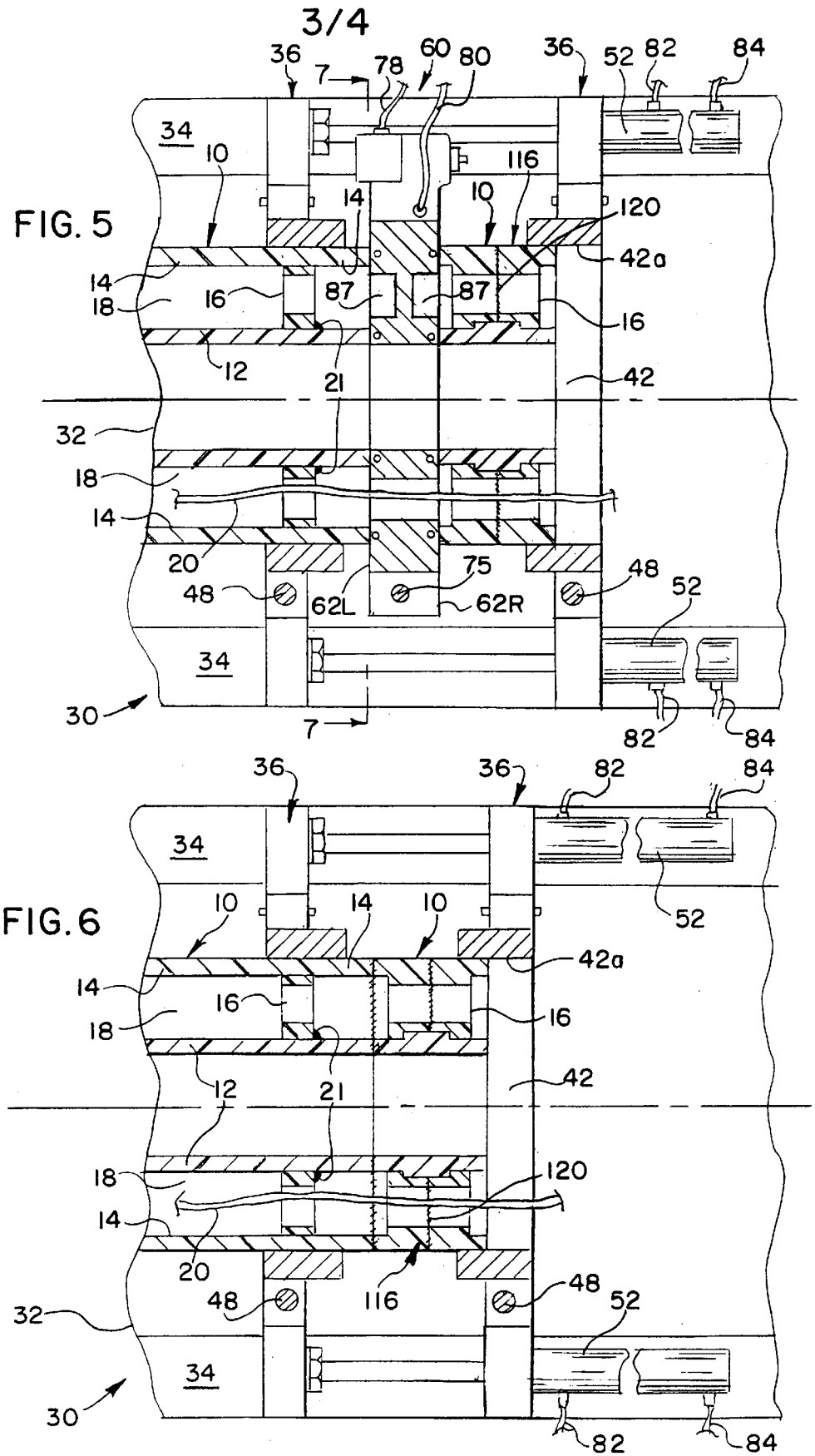

AXIAL INTERLOCK SYSTEM FOR FLUID CONTAINMENT SYSTEM HAVING INNER AND OUTER CONDUITS

This application is a continuation of application Ser. No. 08/045,626 filed Apr. 4, 1993 now abandoned.

BACKGROUND OF THE INVENTION

1. Field of the Invention

The present invention relates to a new and improved fluid containment system of the type employing an inner fluid carrier conduit of one type of thermoplastic material and an outer safety conduit of different type of material maintained in spaced apart relation for containing any fluid leakage from the inner carrier. An anchor-spacer is provided to extend between the inner and outer conduits for maintaining a permanently spaced apart relation and for positively anchoring or restricting the conduits against relative longitudinal movement.

In accordance with the present invention, the inner fluid carrier conduit may be made of a relatively high grade, relatively more costly thermoplastic material of a type having a higher rating in terms of temperature, pressure and chemical resistance in contrast to an outer safety containment conduit formed of a less expensive type of thermoplastic material which is not required to have such high ratings as the inner fluid carrier conduit because normally, relatively low pressure and/or temperature conditions obtain except in the case of leaks of relatively large proportions developing in the inner carrier conduit.

2. Background of the Prior Art

In dual conduit, thermoplastic resin, containment type fluid transport systems, it is thought generally to be necessary to make both the inner fluid carrier conduit and the outer safety containment conduit out of the same type of material because of the need for similar materials when end-to-end, butt-fusion type welding is utilized in fabrication of a containment system. Heretofore, it has not been practically possible to utilize a high quality rated inner fluid carrier conduit with a less expensive outer containment conduit because of the difference in welding temperatures of different types of materials involved. For example, polyethylene resins may sell in the range of $0.58 to $0.65 a pound, but are only good for temperatures of up to 140° F. whereas, polypropylene, a much more expensive resin at $2.00 or greater per pound, has a service rating of up to 210° F. In terms of strength and strength to weight ratios, polypropylene may be utilized with less material being required in terms of weight for a given pressure rating and this material, even though more expensive, may be desirable from a chemical resistance standpoint when transporting different types of corrosive or deleterious chemical fluids. On the other hand, the outer containment fluid conduit is only in contact with the fluid carried when a leak develops in the inner fluid carrier conduit and thus the outer conduit is not continuously subjected to intense pressures and temperatures and does not need or require as high a quality rating as the inner fluid carrier conduit may require for a particular job installation.

OBJECTS OF THE INVENTION

Accordingly, it is an object of the present invention to provide a new and improved dual conduit fluid containment system having an inner fluid carrier conduit formed of one type of thermoplastic material and an outer safety containment conduit formed of a different type of thermoplastic material.

Another object of the present invention is to provide a new and improved dual conduit fluid containment system of the character described wherein an inner fluid carrier conduit of relatively high strength and high temperature resistant material is utilized in conjunction with an outer containment conduit formed of material having a lower rated temperature and pressure limitation.

Yet another object of the present invention is to provide a new and improved dual conduit fluid containment system of the character described which can be fabricated with simultaneous, butt-fusion welding of the inner and outer conduits.

Still another object of the present invention is to provide a new and improved dual conduit fluid containment system wherein a positive anchor-spacer is secured between the inner fluid carrier conduit of one type of thermoplastic material and an outer safety containment conduit of a different type of thermoplastic material for maintaining a permanent, radially spaced apart concentric relation between the inner and outer conduits and at the same time limiting or anchoring the conduits against relative longitudinal displacement.

Yet another object of the present invention is to provide a new and improved apparatus for butt-fusion type simultaneous heat welding of a dual conduit fluid containment system having two types of conduit materials embodied therein.

Yet another object of the present invention is to provide a new and improved dual conduit fluid containment system of the character described in which a relatively low cost outer safety containment conduit is utilized in combination with a central, inner, fluid carrier conduit formed of a different type of thermoplastic material having a higher quality rating.

Still another object of the present invention is to provide a new and improved method of forming a dual conduit fluid containment system with simultaneous butt-fusion heat welding of concentric end faces of an inner fluid carrier conduit and an outer safety containment conduit of dissimilar materials.

Yet another object of the present invention is to provide a new and improved welding system for a dual conduit fluid containment system of the character described wherein little or no contamination of different types of materials is encountered during end-to-end butt-fusion heat welding and wherein longitudinally staggered weld joints of the inner and outer conduits is not required.

Still another object of the present invention is to provide a new and improved dual conduit fluid containment system of the character described which provides for anchoring between two types of dissimilar inner and outer plastic materials and which can be utilized for fittings such as elbows and tees.

Yet another object is to provide a new and improved dual conduit fluid containment system of the character described which eliminates problems caused by relative expansion and contraction of the respective inner and outer conduits.

Another object of the present invention is to provide a new and improved dual conduit fluid containment system which is exceptionally economical to utilize because a lower cost, lower limit rated outer containment conduit may be provided in combination with a higher rated, more costly inner fluid carrier conduit.

Still another object of the present invention is to provide a new and improved dual conduit containment system of the character described which does not require longitudinally staggered welding of the inner and outer conduits, respectively, as in many prior art systems even though different types of thermoplastic materials are utilized for an inner fluid carrier conduit and an outer safety containment conduit.

BRIEF SUMMARY OF THE PRESENT INVENTION

The foregoing and other objects and advantages of the present invention are accomplished in a new and improved dual conduit fluid containment system comprising an inner fluid carrier conduit formed of a first type of resinous, heat weldable, thermoplastic material and an outer safety containment conduit formed of a second type of heat weldable, resinous, thermoplastic material aligned coaxially in outwardly surrounding, permanently spaced apart relation for containing any fluid leakage from the inner carrier conduit. Both the inner and outer conduits have heat weldable coplanar aligned, annular end faces and successive sections of the system may be heat welded together by simultaneous, butt-fusion, welding of the inner and outer conduits. An anchor-spacer extends between the inner and outer conduits for securing the conduits in permanent, radially spaced apart concentric relation and against relative longitudinal displacement which would otherwise be encountered because of differential pressures and temperatures obtaining in the respective environment of the inner conduit and the outer conduit. The anchor-spacer includes a pair of coaxially aligned, halves or spacer rings which are secured to the inner and outer conduits and which are provided with confronting, heat weldable surfaces or faces adapted to secure the inner and outer conduits against relative axial displacement when the confronting weld faces of the spacer rings are joined together.

BRIEF DESCRIPTION OF THE DRAWINGS

For a better understanding of the present invention, reference should be had to the following detailed description taken in conjunction with the drawings, in which:

FIG. 1 is a longitudinal cross-sectional view of a simultaneous butt-fusion heat welding apparatus utilized in accordance with the present invention for forming an anchor-spacer of dual conduit fluid containment system in accordance with the present invention;

FIG. 2 is a longitudinal cross-sectional view similar to FIG. 1, but illustrating the welding apparatus in an operating position wherein respective weld faces of the anchor-spacer are being heated prior to butt-fusion welding thereof;

FIG. 5 is a view similar to FIG. 2, illustrating a modified welding apparatus in an operative position for simultaneously heating the end faces of an inner and outer conduit prior to joining sections of the system by a heat butt-fusion weld process;

FIG. 6 is a view similar to FIG. 5, illustrating the welding apparatus in another operative position during simultaneous butt-fusion heat welding of a pair of dual fluid conduit components.

DETAILED DESCRIPTION OF A PREFERRED EMBODIMENT OF THE PRESENT INVENTION

Figure 3:
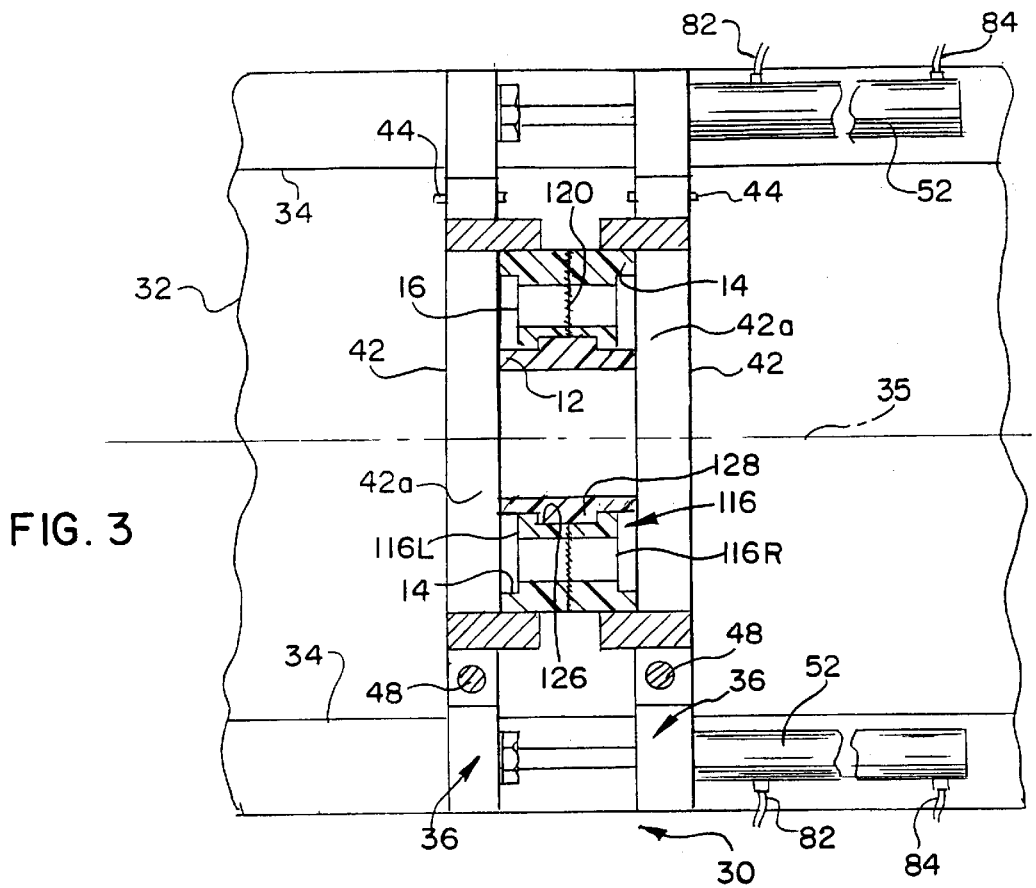
FIG. 3 is a view similar to FIG. 2, illustrating the welding apparatus in another operating position wherein a butt-fusion heat welding operation is taking place.

Referring now more particularly to the drawings, therein is illustrated a new and improved fluid containment system embodied in a plurality of pipe sections and/or fittings generally indicated by the reference numeral 10 and adapted to be butt-fusion, heat welded together in end-to-end relationship as best disclosed in FIGS. 5 and 6. The pipe sections and/or fittings 10 are welded together to provide a continuous inner fluid carrier conduit 12 formed of a first type of resinous thermoplastic material such as polypropylene, polyethylene, polyvinylchloride (PVC) and/or other types of thermoplastic material which can be permanently joined together in a heat welding process.

Normally such welding is accomplished by the application of heat and pressure in a welding process known as butt-fusion, heat welding, or in an extrusion welding process and/or a hot air welding process. A particular type of resin such as, for example, poly-vinylydenefluoride (PVDF) may be chosen in order to accommodate a particular type of fluid in the form of liquid or gas which is to be carried along the inner fluid carrier conduit 12 under desired temperature and pressure conditions selected for a particular application.

In general, the resin that is chosen is selected for a particular fluid to be carried by means of reference to federal, state and local regulations and laws which are pertinent. Reference is also had to resin manufacturer's tables and specifications which set forth the strength, heat, chemical capability and a life expectancy required for a particular application such as, for example, pharmaceutical drains, animal waste disposal systems, chemical assembly processes, and the like, which are often controlled by both state and federal environmental protection agencies. In general, an inner carrier pipe 12 of a selected resin material is formed in an extrusion process and is cut to appropriate lengths, for example, approximately 15 feet long, for ease in handling and fabrication into large systems of considerable length. The inner and outer diameter size and accordingly the wall thickness of the conduit 12 is chosen for accommodating the desired fluid flow rate, the required pressure and temperature conditions that are to be maintained in an inner carrier conduit 12 when formed of welded together end-to-end elongated pipe sections and fittings 10 including anchors, tees, elbows, etc.

In order to avoid environmental contamination should a leak arise permitting the escape of fluid from the inner carrier conduit 12, each pipe section or fitting 10 of the containment system employs an outer fluid containment conduit 14 permanently secured in coaxial concentric relation to the inner carrier fluid conduit 12 by means of a plurality of annular spacers 16 extending radially between the inner and outer conduits 12 and 14 as best shown in FIGS. 3, 5 and 6. An annular leak-age containment space 18 (FIGS. 5 and 6) is thus formed around the inner fluid carrier conduit 12 in order to collect and retain any fluid leakage from faults that may occur in the inner carrier conduit 12.

As more fully set forth in U.S. Pat. No. 4,797,621, assigned to the same assignee as the present application and incorporated herein by reference, electronic systems have been developed for detecting and locating fluid leakages in a fluid line by sensing the presence of fluid in the leakage containment space 18 and for this purpose, elongated detection and control cables 20 (FIGS. 4–7) may be extended between adjacent sections 10. Lengths of cable are normally furnished with each elongated pipe section 10 and both the cables 20 and the pipe sections and/or fittings 10 are normally connected together and welded at a job site. The inner and outer conduits 12 and 14 are simultaneously heat welded together in a butt-fusion process in an end-to-end relation to form a complete, dual conduit fluid containment system with leakage containment provisions in accordance with the present invention.

By furnishing a length of detection cable or other electrical cable 20 slightly longer than a pipe section 10 along with each pipe section, the cumbersome task of feeding or threading a flexible cable 20 between openings in the radial spacers 16 in the containment space 18 is eliminated. The cable 20 furnished in each pipe section 10 is put in place during fabrication of the pipe section at the factory and then the cables 20 in these pipe sections are electrically interconnected on site just before two pipe sections 10 are welded together into permanent position.

In accordance with the present invention, the inner fluid carrier conduit sections 12 and the outer safety containment conduit sections 14 can be formed of different types of heat weldable thermoplastic resins yet an end-to-end butt-fusion heating welding process and apparatus can still be utilized for simultaneously heat welding coplanar end faces of adjacent pipe sections and/or fittings 10 such as a radial anchor-spacer 116 (FIG. 3), tees, elbows and the like.

The ability to use two dissimilar types of thermoplastic heat weldable resins yet still provide simultaneous butt-fusion heat welding results in a number of advantages over prior art systems. Because the inner fluid carrier conduit 12 of a system may be generally subjected to temperatures both high and/or low that are quite different than temperatures acting on the outer safety containment conduit 14, a higher grade of resin may be required for the inner fluid carrier conduit 12 in order to continuously withstand extremes of hot and cold fluids being handled at relatively high operating pressures. Moreover, the resistance to chemical action from the fluid being carried might require a specific type of resin for the inner carrier conduit 12 that is quite different and usually more expensive than the resin that may be suitable for the outer safety containment conduit 14 which is only subjected to contact with the fluid being carried when leakage of the inner carrier 12 does in fact occur.

Normally, the outer safety containment conduit 14 may be subjected to less in the way of hot or cold temperature extremes and less in the way of high or low pressure extremes so that overall a less expensive type of resin material may be used and/or a reduced wall thickness of the outer conduit 14 may be sufficient. The use of two different types of plastic resins provides an exceptional economic advantage because the outer safety containment conduit 14 must necessarily have an inside diameter greater than the outside diameter of the inner fluid carrier conduit 12 in order to provide a leakage containment space 18 and this automatically requires more resin material for a given length system in the outer conduit 14 than in the inner conduit 12, assuming the wall thickness is the same for both. However, in accordance with the invention, the wall thickness of the outer conduit 14 may be reduced from that normally used and a less expensive type of material may be used while still utilizing, a simultaneous butt-fusion welding technique.

As an example, when a fluid such as hot water is to be transported in a containment system at a temperature of 160° and a pressure of 50 psi, the inner fluid carrier conduit 12 could be made of polypropylene resin which is suitable to handle the pressure and temperature involved. A resin such as lower cost poly-ethylene could not be utilized for this inner conduit application because the temperature required is too high. However, polyethylene resin could likely be used for the outer safety containment conduit 14 which is un-likely to encounter a temperature in excess of 140° F. even if a leak occurs in the inner carrier 12. Moreover, the wall thickness of the less costly outer conduit 14 can be reduced because of the lower pressure environment. The cost savings available in the system of the present invention utilizing two different types of resin materials yet still utilizing end-to-end butt-fusion welding techniques are thus very significant.

The pipe sections and fittings 10 are designed to carry a wide variety of different fluids and to provide leak containment protection for the environment surrounding the system, and accordingly, the inner carrier fluid conduit 12 and the outer fluid containment conduit 14 of each pipe section and/or fitting 10 are securely interconnected and anchored together by means of circular spacers 16 and/or anchor-spacers 116. The spacers 16 and anchor-spacer 116 are formed of thermo-plastic material the same as or compatible with the material of either the inner conduit 12 or the outer conduit 14 and the spacers 16 in pipe sections 10 can be fastened in place by a ring weld 21 as shown in FIGS. 5 and 6. As illustrated in FIG. 5, the radial spacers 16 are spaced close to the end of a pipe section 10 and at appropriate intervals intermediate the opposite end faces of each pipe section. A single spacer 16 is normally provided adjacent the end of each pipe section and this spacer is closely adjacent to, but spaced in-wardly of, a heat weldable outer end face of the pipe section 10 that is normal to the longitudinal axis of the pipe section.

Because of different materials such as polypropylene and polyethylene, for example, being utilized for an inner carrier conduit 12 and an outer containment conduit 14, respectively, it is necessary to provide a heat welding process and apparatus capable of operating at different welding temperatures at the same time because usually different materials have different weld temperatures for best results. Moreover, different welding temperatures are required in order to reduce or eliminate contamination by material from one resin component which may run into the weld area of the other resin component. If a single welding temperature is utilized for both resins, one type of material may become too soft and start to melt and run before the other type of material has reached a suitable welding temperature.

Referring to FIGS. 1, 2 and 3, a new and unique spacer-anchor 116 is provided for permanently securing the respective inner conduits 12 to the outer conduits 14 in correct, radially spaced apart relation as well as for securing the respective conduits against relative longitudinal displacement at anchor points wherever a spacer anchor 116 is installed as illustrated in FIG. 6. In general, an anchor-spacer 116 may be required whenever the direction of a containment system installation changes significantly.

The spacer anchor 116 is formed of two halves or annular spacer rings 116L and 116R, FIGS. 1, 2 and 3, which have confronting, planar, annular weld faces 118 eventually joined together as shown in FIG. 3 to provide a continuous weld area 120. Each spacer ring 116L and 116R is formed with an annular recess having a shoulder 122 (FIG. 1) around a cylindrical center bore 124, which bore is dimensioned to fit around the outside diameter of the central carrier conduit 12 when the halves or spacer rings are welded together as shown in FIG. 3. The confronting annular recesses or shoulders 122 of the respective halves 116L and 116R cooperate to form an annular ring-like space 126 that is dimensioned to closely accommodate a central rib 128 integrally formed on the outside surface of the inner carrier conduit 12 between opposite end faces thereof. A close fit is provided between the annular rib 128 and the confronting faces of the shoulders of the recesses 126 to securely interlock the anchor-spacer 116 with the respective inner carrier conduit 12 when the weld 120 is completed.

The outer safety containment conduit 14 may be integrally formed on each of the halves 116L and 116R and thus no ribs or accommodating recess need be provided adjacent the outer containment conduit 14. Moreover, the spacer halves 116L and 116R could be integrally formed on the central inner carrier conduit 12 and a similar rib interlock system would then be provided between the outer edge portion of the spacer ring halves 116L and 116R and an inwardly extending central rib formed on the inside diameter surface of the outer containment conduit 14. If desired, rib interlocking systems as described herein could be utilized for an anchoring the radial interconnection between the ring or spacer halves 116L and 116R and both the inner conduit segment 12 and the outer conduit segment 14.

In accordance with the features of the present invention, the anchor-spacer 116 is assembled from the pair of halves or spacer rings 116L and 116R by welding together the confronting end faces 118 in a new and improved butt-fusion heat welding apparatus 30 as shown in FIGS. 1–4. The welder 30 is generally similar to the welding apparatus 30 that is shown and described in copending U.S. patent application Ser. No. 07/704,409, filed May 23, 1991, now U.S. Pat. No. 5,185,049 commonly assigned with this application and hereby incorporated by reference.

Only the principal differences between the welding apparatus 30 of the present application and that shown and described in the aforementioned, incorporated U.S. copending patent application will be described in detail herein and reference can be had to the earlier filed application for a detailed description of the general structure and operation of the welding apparatus 30.

The welding apparatus 30 includes a pair of mobile clamping assemblies 36 movable longitudinally along a central axis 35 and supported on parallel guideways 34 of a base structure 32. Each ring spacer 116 L and 116R of the anchor-spacer 116 is supported in coaxially centered alignment on the axis 35 in a cylindrical surface of a pair of upper and lower clamping jaws 42, which jaws are pivotally interconnected by a hinge pin 46 and adapted to move the spaced apart, parallel confronting annular weld faces 118 together after heating to a suitable temperature level to form the butt-fusion weld 120. For this purpose, a pair of hydraulic cylinders 52 are utilized to control the relative position of the clamping jaws 42 on the ways 34. A clamping screw 48 is provided for each pair of jaws 42 to secure the jaws in a closed or clamping position for holding an annular spacer ring 116L or 116R tightly in clamped engagement against its cylindrically-shaped clamping surface 42a. Before the confronting annular weld faces 118 of the members 116L and 116R are forcefully thrust together by movement of the clamping jaws 42 by the cylinders 52, the weld faces 118 are heated by contact against opposite sides of a mirror type heating assembly 60 (FIGS. 1, 2 and 4).

The heating assembly 60 includes a pair of circular, opposed heating surfaces 62L and 62R on opposite sides facing respective end weld faces 118 of the left hand member 116L and the right hand member 116R as shown in FIG. 1. Each heating surface 62L and 62R is substantially planar in order to closely abut and to heat by conductive contact an adjacent end face 118 which is thus raised to an elevated welding temperature ready for upset butt-welding. As best illustrated in FIG. 4, the heating surfaces 62L and 62R are formed by opposite side faces of a pair of semi-cylindrical members 66 and 68 which are pivotal relative to one another about a pivot pin 70 extending parallel of the longitudinal axis 35. Preferably, the pivot pin 70 is supported from the base 32 on a pair of upstanding brackets 72 at opposite ends of the pivot pin so that the lower member 68 may be pivoted downwardly in a clockwise direction as shown by the arrow "A" in FIG. 4 while the upper half section 66 is pivoted upwardly in a counterclockwise direction as shown by the arrow "B" until both half sections 66 and 68 are spaced outwardly and clear of confronting relation with the opposite weld faces 118 of the respective left and right hand ring spacers 116L and 116R.

Figure 4:
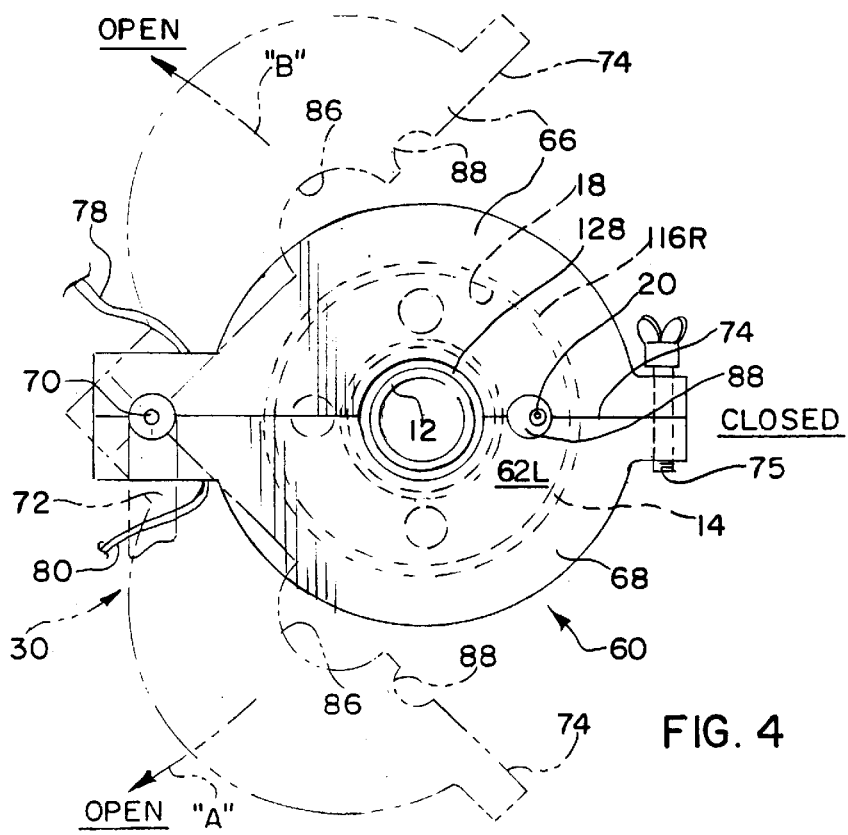
FIG. 4 is a transverse cross-sectional view taken substantially along lines 4—4 of FIG. 2 and with dotted lines representing an open position of the welding apparatus as obtained both before and after a butt-fusion weld has been made.

The lower half member 68 and the upper half member 66 are adapted to abut together along a diametrical edge or plane 74 to form a heating mirror having flat, opposed, circular-shaped heating faces 62L and 62R when the upper and lower members 66 and 68 are closed together in the pipe heating position shown in solid lines in FIG. 4. The planar heating faces 62L and 62R of the respective lower and upper half members 68 and 66 are heated from the inside by electric resistance heating coils or elements 76 and these coils are supplied with precisely controlled electrical energy through flexible electrical leads 78 and 80. A threaded pin 75 may be provided to secure the members 68 and 66 together in a closed position.

The amount of electrical energy supplied to the resistance heaters 76 is carefully controlled so as to elevate the surface temperature of the respective planar faces 62L and 62R to a selected temperature level for softening the material of the end faces 118 of the respective ring spacers 116L and 116R to a desired consistency in preparation for welding and upset. After the selected welding temperature has been reached for a particular type of resin material being used, the respective upper and lower half members 66 and 68 are pivoted away from one another in opposite directions as indicated by the arrows "A" and "B" and the fluid cylinders 52 are pressurized appropriately through fluid lines 82 and 84 to rapidly move one or both of the clamping assemblies 36 toward one another so that the heated, softened material on the end faces 118 will contact one another under sufficient pressure and elevated temperature to weld together in a high quality, annular, butt-fusion weld as indicated by the reference numeral 120 in FIG. 3, thus forming the completed anchor-spacer 116. The assembly has an inner conduit 12 of one type of resinous material and an anchor-spacer concentric outer conduit 14 of yet another type of resinous material.

The amount of force exerted by the respective hydraulic cylinders 52 is carefully selected to be appropriate for the particular plastic material involved to insure that a high quality butt-fusion weld 120 is achieved. Similarly, the heating temperature attained by the circular, mirror-like heating faces 62L and 62R is selected so that the particular thermoplastic material of the members 116L and 116R is softened to the desired consistency ready for welding when the increased butt-fusion welding pressure is attained and held for a selected time period. After the upset weld 120 is formed, the material is cooled and a solid, butt-fusion weld 120 is established to complete assembly of the anchor-spacer 116.

Each heated mirror member 68 and 66 is formed with a semi-cylindrical aperture or recess 86 (FIG. 4) along a diametrical edge 7 having a dimension suitable for holding the inner fluid carrier conduit 12 in place in centered coaxial alignment on the axis 35 while the ring spacers 116L and 116R are being heated and during the upset welding process as described. Smaller semicylindrical apertures or recesses 88 may be also provided at a location outboard of the larger central aperture formed by the cooperating recesses 86 if required for accommodating a cable 20 during the heat welding process. It should be noted that the completed anchor-spacer 116 requires no welding of dissimilar material yet the inner conduit 12 and the outer conduit 14 are formed of dissimilar material. It should also be noted that the heating members 68 and 66 perform two functions in heating the end surfaces 118 and simultaneously supporting and holding the inner conduit 12 in coaxial position during heating and welding.

Figure 7:
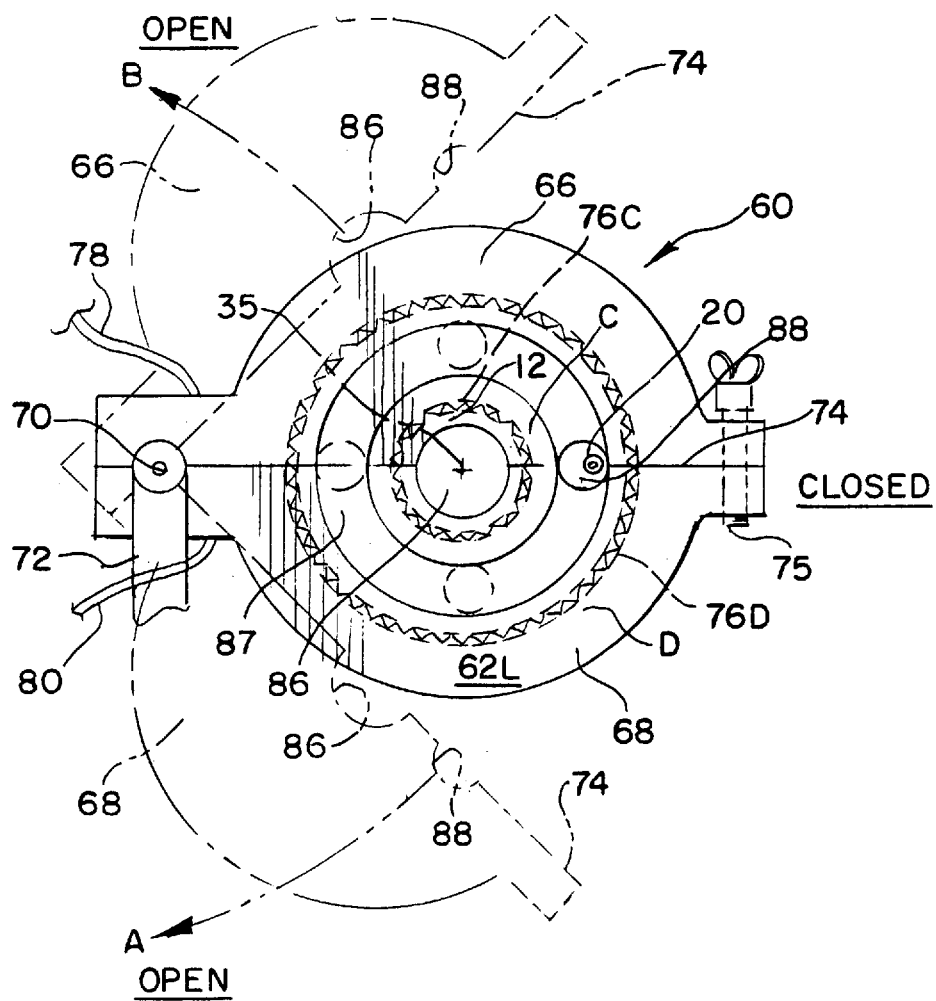
FIG. 7 is a view taken substantially along lines 7—7 of FIG. 5, illustrating a heating surface of the welding apparatus and with the apparatus shown in an open condition in dotted lines.

Referring now more specifically to FIGS. 5, 6 and 7, a welding apparatus 30 therein shown is modified slightly from the apparatus 30 of FIGS. 1–4 in that the heating mirror assembly 60 is provided with modified upper and lower heating members 68 and 66 designed to operate at different temperature levels to accommodate the different types of thermoplastic resins that are used for the inner fluid carrier conduit 12 and the outer safety containment conduit 14.

The welding apparatus 30 of FIGS. 5–7 is especially designed to provide a butt-fusion heat welding process for welding together of successive dual material pipe sections 10 in end-to-end relation and as shown is utilized for butt-fusion welding of adjacent end faces of a pipe section 10, for example, on the left and an anchor-spacer 116 or other fitting such as tee, elbow, etc. on the right. In either case, confronting pairs of coplanar heat weldable end faces of an inner fluid carrier conduit 12 and an outer safety containment conduit 14 are simultaneously welded together even though different types of thermoplastic materials having different welding temperatures and different weld characteristics are utilized for the respective inner and outer conduits 12 and 14.

The circular-shaped, opposite heating surfaces 62L and 62R on each side of the mirror assembly are provided with two separate and distinct concentric heating zones labeled "C" and "D" in FIG. 7 and each zone has a separate heating element 76C and 76C, respectively, individually controlled to provide the desired surface temperature for the material involved. The zones "C" and "D" may be insulated from one another by an annular groove 87 in the heating surface which is concentric with the axis 35 and spaced between the ring-like heating elements 76C and 76D as shown in FIGS. 5 and 7.

Each of the elements 68 and 66 of the mirror assembly 60 of FIGS. 5–7 may be formed with a semicylindrical recess 86 along a diametrical mating edge 74 at the center and the diameter of the recess 86 is less than the inside diameter of the inner conduit 12 so as to provide for ample contact heating of the end face of the inner conduit 12 in zone "C".

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An anchor for a fluid containment system formed with an inner fluid carrier conduit of a first diameter and an outer safety containment conduit of a second diameter, said second diameter being relatively larger than said first diameter, the anchor comprising:

a pair of coaxially aligned spacer rings having opposing ends adapted to be axially secured to said outer safety containment conduit, each spacer ring formed with a centrally disposed cylindrical bore sized to receive said inner fluid carrier conduit, each spacer ring extending radially between said inner fluid carrier conduit and said outer safety containment conduit forming a ring portion having opposing end faces for securing said spacer rings to said outer safety containment conduits, each of said spacer rings formed with an annular recess concentrically disposed relative to said cylindrical bore and confronting heat weldable surfaces to enable said spacer rings to be welded together, said annular recesses adapted to enable an annular rib rigidly carried by said inner fluid carrier to be captured between said annular recesses of said spacer rings when said confronting heat weldable surfaces are heat-welded together to prevent axial displacement of said central rib relative to said spacer rings.

2. An anchor as recited in claim 1, wherein said annular rib is integrally formed with said inner fluid carrier conduit.

3. An anchor as recited in claim 2, wherein said spacer rings are sized to enable said spacer rings to be butt welded to said outer safety containment conduits.

4. A fluid containment system, comprising:

an inner fluid carrier pipe made of a first type of heat weldable thermoplastic material having a first planar end face adapted to be heat welded to an adjacent carrier pipe of similar material;

an outer containment pipe made of a second type of heat weldable thermoplastic material having a second planar end face in coaxial alignment with said first end face and adapted to be heat welded to an adjacent containment pipe of similar material; and an annular anchor interconnected between said carrier pipe and said containment pipe for restraining relative radial and coaxial movement between said pipes, said anchor comprising a pair of spacer rings integral with one of said pipes and heat welded together, and other of said pipes including an integral annular rib, said spacer rings formed with annular recesses adapted to capture said annular rib when said confronting weldable surfaces are heat welded together for restraining relative axial movement between said anchor and said other pipe.

5. The fluid containment system of claim 4, wherein:

said spacer rings Include confronting annular weld faces adapted to heat welded together and spaced apart from said annular recesses.

6. The fluid containment system of claim 4, wherein:

said annular recesses are disposed on opposite sides of said weld faces in an axial direction with respect thereto.

* * * * *